Dec. 15, 1964    R. A. FERRARA    3,161,076
LOCKING MEANS FOR RELEASABLE BOLSTERS AND
SIDE WINGS FOR VEHICLE SEATS
Filed Feb. 13, 1963    2 Sheets-Sheet 1
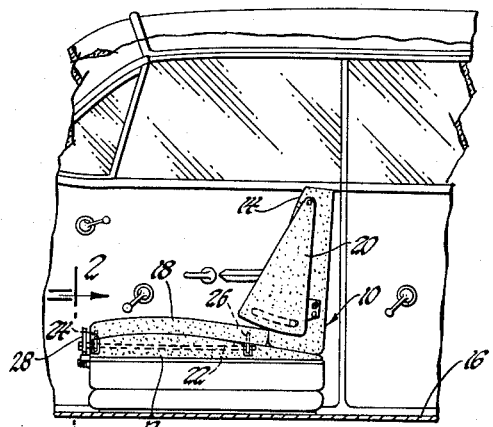
Fig.1
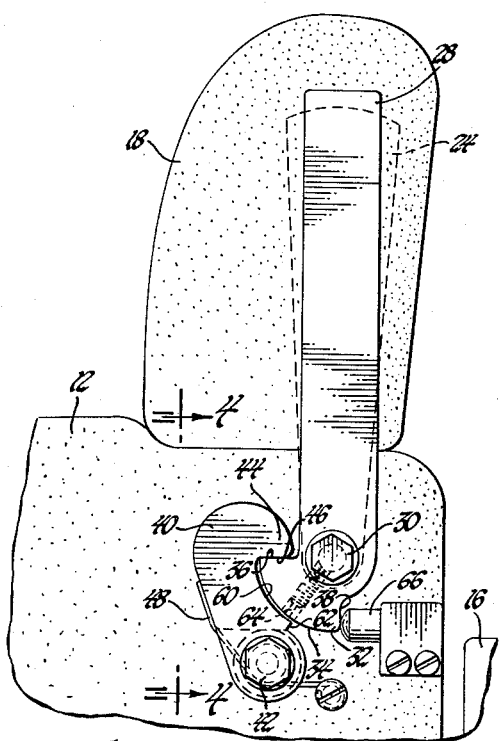
Fig.2
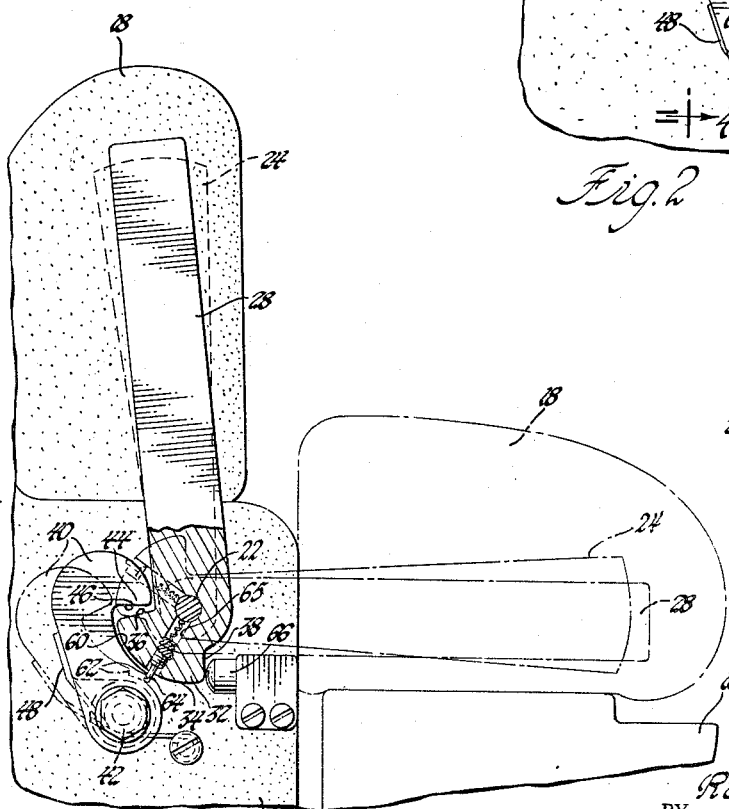
Fig.3
Fig.4
INVENTOR.
Rudolph A. Ferrara
BY
J. L. Carpenter
ATTORNEY

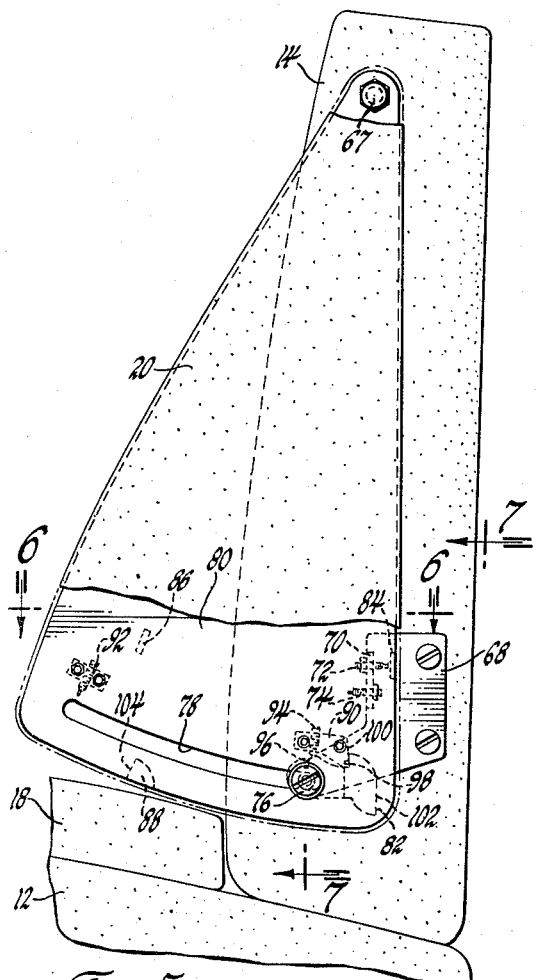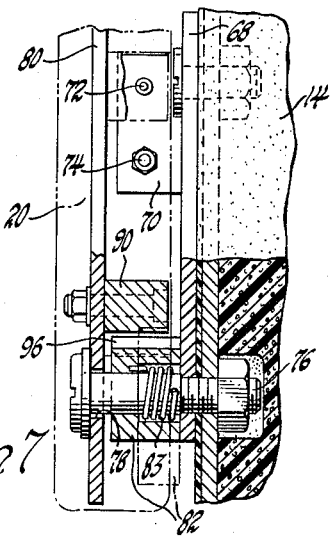

United States Patent Office 3,161,076
Patented Dec. 15, 1964

3,161,076
LOCKING MEANS FOR RELEASABLE BOLSTERS AND SIDE WINGS FOR VEHICLE SEATS
Rudolph A. Ferrara, Warren, Mich., assignor to General Motors Corporation, Detroit, Mich., a corporation of Delaware
Filed Feb. 13, 1963, Ser. No. 258,184
5 Claims. (Cl. 74—532)

This invention relates to a vehicle seat having movable cushion bolsters and side wings and more particularly to the locking means for securing such bolsters and wings in their various positions.

In the newer bucket seats for vehicles, the bolsters on the seat cushion and the side wings on the seat back cushion have increased in size for reasons of comfort and safety to the extent that they interfere with ease of entrance and exit from the seat. Movable bolsters and wings have been developed which may be pivoted into a supporting position when the seat is occupied, and to an out of the way or open position for ease of entrance and exit to the seats. The present invention is directed to a means for securing these members in the desired position.

An object of this invention is to provide locking means normally securing such a movable supporting member in its supporting position but disengageable by manipulation of the member to permit return movement thereof to its open position.

Another object of this invention is to provide resilient stop means normally limiting travel of the movable member in one direction but yieldable to permit further travel beyond the locked position to enable detent means to coact in disengaging the locking means upon return movement of the member in the opposite direction.

These and other objects of this invention will become more apparent as reference is had to the accompanying specification and drawings wherein.

FIGURE 1 is a side view of a portion of an automotive vehicle body showing a movable cushion bolster and seat back wing in supporting positions utilizing the present invention.

FIGURE 2 is an enlarged front view of the seat bolster and locking means therefore in supporting position taken in the direction of the arrows substantially along the line 2—2 of FIGURE 1.

FIGURE 3 is the same view as FIGURE 2 showing, in solid lines, the bolster in the over-travel position to unlock the bolster lock; and, in phantom lines, the open position of the seat bolster and locking means.

FIGURE 4 is a view taken substantially along line 4—4 of FIGURE 2 showing a side view of the locking means, with parts in section and broken away.

FIGURE 5 is an enlarged side view of the seat back and seat back wing in supporting position, with sections broken away to show the locking means for the seat back wing.

FIGURE 6 is a top view taken substantially along line 6—6 of FIGURE 5 in the direction of the arrows, with parts in section and broken away, showing the stop tabs and resilient stops for the seat back wing.

FIGURE 7 is a view of the seat back wing locking means taken substantially along line 7—7 of FIGURE 5, with parts in section and broken away.

FIGURE 8 is a side view of the seat back wing locking means showing, in solid lines, the locking means when the seat back wing is in operating position; and, in phantom lines, the seat back wing plate (with parts broken away) and the locking lever in unlocked position.

FIGURE 9 is a side view of the seat back wing locking means showing the locking means when the seat back wing is in open position, with parts broken away.

Referring now to the drawings, FIGURE 1 shows a vehicle seating unit 10 having a seat cushion 12 and a seat back cushion 14 mounted in a vehicle body 16. A seat cushion bolster 18 and a seat back wing 20 are shown in supporting position. The seat bolster 18 is rigidly secured by two arms 24, 26 to a shaft 22 which is suitably journalled for rotation within the cushion 12.

As best seen in FIGURES 2 through 4, rigidly secured by a bolt 30 to the front end of the shaft 22 is a handle 28 for manually rotating the bolster between its upright or occupant supporting position shown in full lines in FIGURES 2 and 3, and its reclining or open position shown in phantom lines in FIGURE 3. The end of the handle 28 adjacent the bolt 30 has a catch portion 32 comprising a curved outer surface 34 and two radially extending shoulder means or faces 36, 38.

Adjacent the catch portion of the handle 28 a locking lever 40 is pivotally secured to the vehicle seat by bolt 42. The locking lever 40 is in the same plane as the handle 28 and has a hook portion 44 having a face 46 which is adapted to coact with shoulder 36 of the handle catch portion 32 to secure the bolster and handle in an upright position and prevent rotation in one direction, as seen in FIGURE 2. The locking lever 40 is spring biased toward locked position and handle 28 by a spring 48 positioned about bolt 42 and anchored to the seat. Extending from the face 46, the locking lever 40 is formed with a cam surface 60 having the same curvature as surface 34 of catch portion 32.

Detent means, in the form of a pawl 64 and a notch means 62, is provided for disengaging the lever 40 from its locked position in response to manipulative movement of the bolster for that purpose. Pawl 64 is mounted in a guide means or hole 65 formed in catch portion 32 and engages notch 62 when projecting from surface 34 in its extended position, as seen in FIGURE 3. In retracted position, the end of the pawl 64 is in the plane of surface 34, as seen in FIGURE 2. A resilient stop 66, in the form of a spring biased plunger, is mounted to the seat frame to limit the rotation of handle 28 by contacting shoulder 38 of catch portion 32.

In operation, to unlock the seat bolster from its vertical or supporting position, the handle 28 is rotated in the direction to swing the bolster further inboard of the seat, i.e. counterclockwise about the axis of bolt 30, as seen in FIGURE 2. In so rotating handle 28, the resilient stop 66 is depressed, as seen in FIGURE 3, and the surface 34 rotates relative to the cam surface 60. As the surface 34 is moved, spring biased pawl 64 clears surface 60 and is freed to extend beyond surface 34. Then when the handle 28 is rotated clockwise about the center of bolt 30, pawl 64 engages shoulder 62 and rotates the locking lever 40 counterclockwise about bolt 42, removing hook portion 44 with face 46 from the path of shoulder 36 and allowing the handle 28 and bolster 18 to be rotated to the open position as shown in phantom lines in FIGURE 3. In open position, the bolster 18 rests upon the body 16, which acts as a support for the bolster in open position, allowing easier entrance and exit from the vehicle seat.

To return the bolster 18 to the first or supporting position, handle 28 is moved counterclockwise about the center of shaft 30, as viewed in FIGURE 3. When the bolster 18 reaches operating position, as seen in FIGURE 2, the shoulder 38 of catch portion 32 contacts the stop 66; and the locking lever 40, spring biased by spring 48, moves into locking engagement with the catch portion 32, depressing the pawl 64 and placing face 46 and shoulder 36 in engagement with each other to secure the bolster against clockwise rotation.

Referring now to FIGURES 5 through 9, the seat back wing 20 is rotatably secured to the seat back cushion 14 by bolt 67. A plate 68 is secured by suitable means to the lower edge of seat back cushion 14 with an arm 70 extending at right angles therefrom and supporting two resilient stops 72, 74. A guide bolt 76 is secured to plate 68 and extends outwardly at right angles from seat plate 68 through a slot 78 in a wing plate 80 suitably mounted in the seat back wing 20. The guide bolt 76 and slot 78 keep the wing 20 properly spaced from the seat back 14 during rotative movement therebetween. A T-shaped locking lever 82 is rotatably mounted on bolt 76 between the wing plate 80 and the seat back plate 68. A centering spring 83 rotatively biases the locking lever 82 to a generally horizontal locked position wherein the T appears to be positioned on its side.

Two stop tabs 84, 86 are secured to the wing plate 80 in locations to contact the limit stops 72, 74, respectively, and limit the extreme rotative movements of the wing. Two locking tabs 88, 90 are secured to the wing plate 80 so that shoulders 100, 104 thereon may contact faces 98, 102, respectively, of locking lever 82 to secure the wing 20 from rotation in one direction at supporting position, as shown in FIGURE 5, and in the opposite direction at open position, as shown in FIGURE 9. Detent means, in the form of two spring biased pawls 92, 94 secured to wing plate 80 adjacent slot 78 and a notch 96 in the locking lever 82, are provided for disengaging the locking lever 82 from its locked position in response to manipulative movement of the wing from either secured position.

To move the wing 20 from the supporting position of FIGURE 5 to the open position of FIGURE 9, the wing 20 is pivoted clockwise about bolt 67. The resilient stop 72 accommodates such clockwise pivoting whereby pawl 94 engages notch 96. Then, as the seat back wing 20 is moved counterclockwise about bolt 67, the locking lever 82 is rotated clockwise about bolt 76 to unlocked position by the holding action of pawl 94 in the notch 96; thus, freeing the seat back wing 20 for rotation to the open position of FIGURE 9. As the wing 20 is rotated to open position, the locking lever 82 rides over locking tab 88 and then stop tab 86 engages limit stop 74. At this point, the locking lever 82 is returned to its locked position by spring 83 whereby face 102 of the locking lever 82 and shoulder 104 of the locking tab are in abutting engagement, as seen in FIGURE 9, securing the wing 20 in its open position.

To return the wing 20 to its supporting position, the wing 20 is rotated counterclockwise about bolt 67 compressing limit stop 74 with stop tab 86 to allow pawl 92 to move into notch 96. Then, as the seat back wing 20 is moved clockwise about bolt 67 toward supporting position, the locking lever 82 is rotated to unlocked position, allowing the wing 20 to move freely toward supporting position. As the wing 20 approaches supporting position, locking lever 82 rides under locking tab 90, stop 72 contacts stop tab 84 and locking lever 82 is returned to locked position by spring 84 to secure wing 20.

While the preferred embodiments of the present invention have been shown and described herein, it is obvious that many structural details may be changed without departing from the spirit and scope of the following claims.

I claim:

1. Locking means to secure two members from relative movement, comprising a fixed member, a member mounted for movement relative to said fixed member, a locking lever movably secured to one of said members, said locking lever being movable between a locked position and an unlocked position, shoulder means on the other of said members engageable by said lever when in said locked position to limit said relative movement of said members in one direction, detent means including an element on said other member engageable with a mating element on said lever, said detent means being interengaged in response to movement of said other member in the direction opposite said one direction from a position wherein said shoulder means is engaged by said lever, whereby return movement of said other member in said one direction with said detent means engaged effects the movement of said lever to unlocked position permitting relative movement between said members.

2. Locking means to secure two members from relative movement, comprising a fixed member, a member mounted for movement relative to said fixed member, a locking lever movably secured to one of said members, said locking lever being movable between a locked position and an unlocked position, means biasing said lever to its locked position, shoulder means on the other of said members engageable by said lever when in said locked position to limit said relative movement of said members in one direction, notch means on said lever, pawl means on said other member and movable therewith relative to said one member, said notch means being located for engagement by said pawl means in response to movement of said other member in the direction opposite said one direction from a position wherein said shoulder means is engaged by said lever whereby return movement of said other member in said one direction with said pawl means engaged in said notch means effects the movement of said lever to unlocked position permitting relative movement between said members.

3. Locking means as claimed in claim 2, together with guide means accommodating movement of said pawl means between an extended position engageable with said notch means and a retracted position, and a cam surface on said lever adjacent said notch and cooperable with said pawl means to cam the latter to its retracted position in response to movement of said lever to locked position by said biasing means.

4. Locking means to secure two members from relative movement, comprising a fixed member, a movable member mounted for movement relative to said fixed member, said movable member being movable between a first position and a second position, resilient stop means opposing and limiting extreme movement of said movable member, a locking lever movably secured to one of said members, a spring biasing said locking lever to a central locked position, said lever being movable therefrom to unlocked positions spaced on either side of said locked position, a first shoulder and a second shoulder on the other of said members cooperable with said lever when in said locked position for engageably securing said movable member at said first position and said second position, respectively, detent means including a first element and a second element on said other member, said elements being engageable with a mating element on said lever, said first element being interengaged with said mating element in response to movement of said other member in said one direction from said first position with said stop means resistingly opposing and limiting such movement, whereby return movement of said other member in said opposite direction with said first element engaged with said mating element effects the movement of said lever to an unlocked position permitting relative movement between the members to said second position, said second element being engageable with said mating element in response to movement of said other member in said opposite direction from said second position with said stop means resistingly opposing and limiting such movement, whereby return movement of said other member in said one direction with said second element engaged with said mating element effects the movement of said lever to an unlocked position permitting relative movement between the members to said first position.

5. Locking means to secure two members from relative movement, comprising a fixed member, a movable member mounted for movement relative to said fixed member between a first position and a second position, support means secured to said fixed member to limit relative movement of said movable member at said second position, said support means also supporting said movable member in said second position, a locking lever movably secured to one of said members, said locking lever being movable between a locked position and an unlocked position, shoulder means on the other of said members engageable by said lever when in said locked position to limit said relative movement of said members in one direction when said movable member is in said first position, detent means including an element on said other member engageable with a mating element on said lever, said detent means being interengaged in response to movement of said other member in the direction opposite said one direction from a position wherein said shoulder means is engaged by said lever, whereby return movement of said other member in said one direction with said detent means engaged with said mating element effects the movement of said lever to unlocked position permitting relative movement between said members allowing said movable member to move to said second position.

References Cited in the file of this patent

UNITED STATES PATENTS

| | | |
|---|---|---|
| 979,049 | Thomson | Dec. 20, 1910 |
| 1,494,118 | Kaiser | May 13, 1924 |
| 2,917,109 | Marsh | Dec. 15, 1959 |